Feb. 10, 1931.  L. A. MAXSON  1,791,733

HOISTING DEVICE

Original Filed Jan. 19, 1922

Inventor:
Louis A. Maxson.
by.
atty.

Patented Feb. 10, 1931

1,791,733

UNITED STATES PATENT OFFICE

LOUIS A. MAXSON, OF CLAREMONT, NEW HAMPSHIRE, ASSIGNOR TO SULLIVAN MACHINERY COMPANY, A CORPORATION OF MASSACHUSETTS

HOISTING DEVICE

Application filed January 19, 1922, Serial No. 530,426. Renewed December 27, 1929.

My invention relates to hoisting or haulage devices, and more particularly to such devices of the portable type.

An object of my invention is to provide an improved hoisting mechanism. Another object of my invention is to provide an improved hoisting mechanism which may have a driving motor incorporated therewith in an improved manner and in which the necessary gearing for transmitting the power of the motor to the hoisting drum may be reduced to a minimum. A further object of my invention is to provide a very compact hoisting mechanism having large rope winding capacity. Other objects and advantages of my invention will hereinafter more fully appear.

In the accompanying drawings I have shown for purposes of illustration one form which my invention may assume in practice.

In these drawings,—

Figure 1:
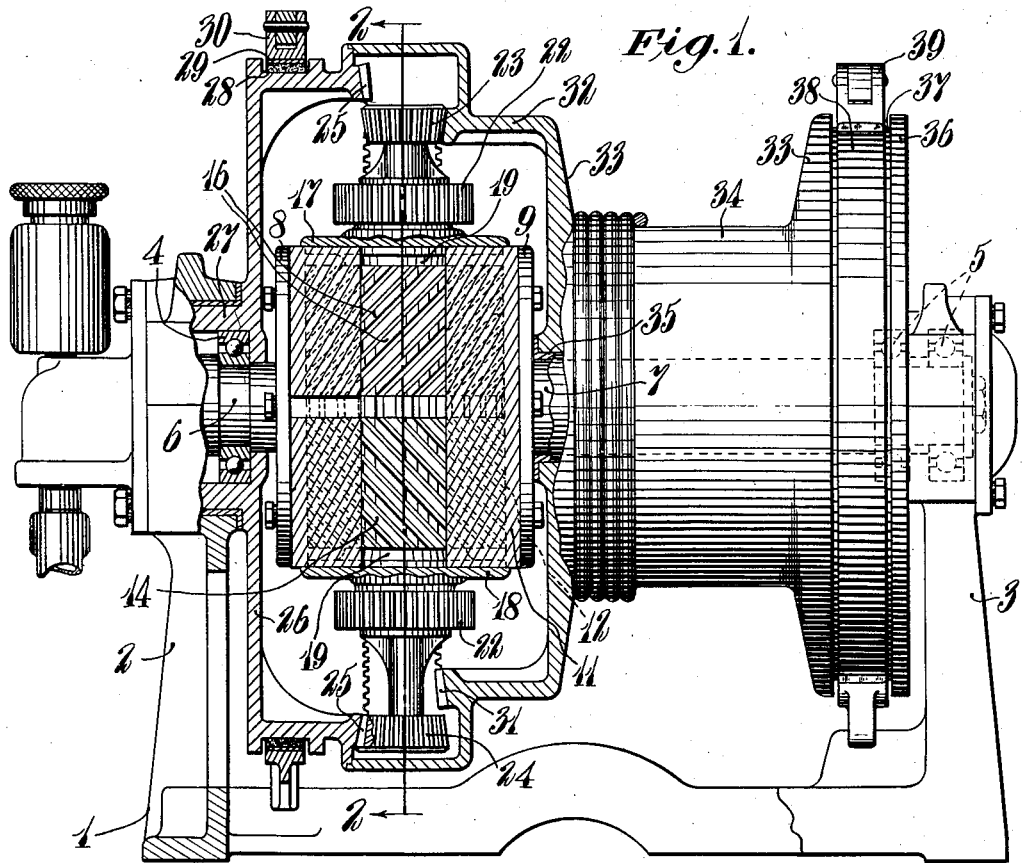
Fig. 1 is a view partially in elevation and partially in central vertical section through the illustrative embodiment of my improved hoisting mechanism.
Figure 2:
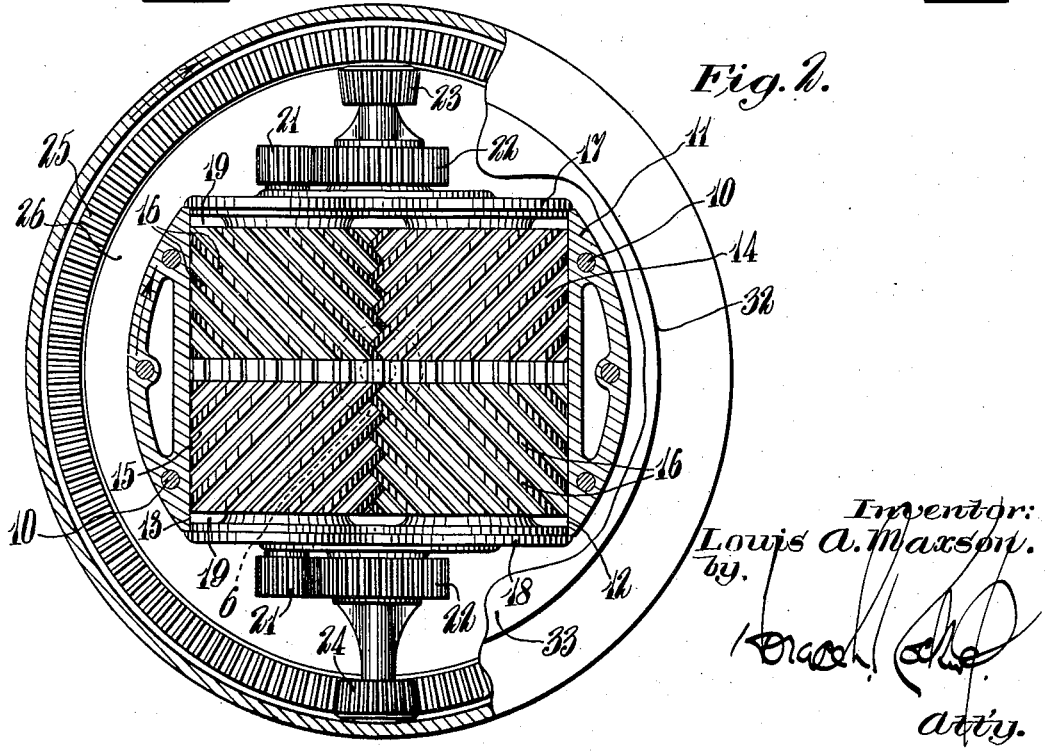
Fig. 2 is a view partially in elevation, but mainly in section on the line 2—2 of Fig. 1.

In the illustrative embodiment of my invention which I have shown in the accompanying drawings and shall now describe, it will be noted that I have shown the same comprising a frame 1 having upstanding hangers 2 and 3 formed at the opposite ends thereof. In these hangers there are journaled as at 4 and 5 a pair of shaft members 6 and 7. These shaft members are provided with attaching plates formed integral therewith and respectively designated 8 and 9, which plates are secured by heavy screws 10 to a motor housing 11. The motor housing as indicated in Fig. 2 is provided with a pair of intercommunicating bores 12 and 13 in which there are rotatable rotors 14 and 15, which rotors are provided with intermeshing toothed blades 16 cooperating to form pockets which expand upon rotation of said rotors. The opposite ends of the housing 11 are closed by end plates 17 and 18 which are spaced from the ends of the rotors as indicated at 19 to provide for exhaust chambers and these end exhaust chambers may discharge through ports, not shown, in the plates 17 and 18 and then to the atmosphere through ports in the plate 26, also not shown.

One of the rotors, herein the rotor 15, is provided at the opposite ends of its supporting shaft with pinions 21 which mesh with larger gears 22 supported upon suitable shafts, not shown, arranged coaxially with the line of mesh of the rotors. The gears 22 carry with them bevel gears 23 and 24, one at either end of the motor housing, and of these gears the gear 24 meshes with a gear 25 which is formed upon a plate 26, the latter having a collar 27 surrounding the bearing 4 and journaled in the hanger 2. The gear carrying plate 26 is provided upon its external periphery with a braking surface 28 with which a brake band 29 controlled by manual control means 30 is arranged to cooperate. It will be evident that when the brake band 29 is applied, the member 26 will be held stationary and upon rotation of the rotors 14 and 15 the coaction of the pinion 24 with the gear 25 will cause the motor housing to rotate about the axis of the shaft 6. (Note the arrows in Fig. 2). The pinion 23 meshes with a gear 31 which is carried by a collar member 32 formed upon one of the end flanges 33 of a rope winding drum 34 which is journaled as at 35 upon the shaft 7. The other end flange 33 is provided with an annular collar 36 having a braking surface 37 formed thereon with which a brake band 38, provided with a manual control means 39, cooperates. It will be noted that the gear 23 rotates in the same direction as the gear 24 and that if the number of teeth on the gear 31 be in the same ratio to the number of the teeth of the gear 23, as the number of teeth on the gear 25 to the number on the pinion 24, and if the revolutions per minute of the gears 23 and 24 be the same, then there would be not rotation of the drum 34 at all. This is not the case, however, and the various gears are so designed as to produce by their cooperation the desired slow movement of the drum. By varying the tooth ratios of the various gears, any desired condition can be obtained, including making the direction of rotation of the drum either the same or opposite to that of the motor. By way of example we may assume that ten revolutions of the gears 21 cause the motor housing to make exactly one complete revolution while, by reason of the tooth ratios of the pinions selected, the pinion 23 would run around only ninety-five percent of the circumference of gear 31. Then, obviously, the drum 34 would be moved one twentieth of a revolution for each ten revolutions of the pinions 21 and a very large reduction in speed and increase in torque would result. Any desired transformation can obviously be obtained.

From the foregoing description, the mode of operation of this device will be readily apparent. When the brake band 29 is applied and the brake band 38 released, the motor will rotate and by means of the gearing described will rotate the drum. When, on the other hand, the brake band 38 is applied and the brake band 28 released the drum will be held and the motor will drive the member 26. It will thus be evident that the motor can be run continuously while the drum is driven or released as desired, and that the rope can even be pulled off the drum while the motor is running, the sole effect being to increase the idle rotation of the member 26.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a hoisting mechanism, a motor having intermeshing rotors, means for supporting said motor for rotation about an axis transverse to the plane including the axes of rotation of the motor rotors, a drum supported coaxially with the axis of rotation of said motor, and means for effecting driving of said drum by said motor.

2. In a hoisting mechanism, a rotary motor having a rotatable casing, pinions driven by said motor arranged at opposite ends of said casing, a fixed gear with which one of said pinions cooperates, a driven element mounted for rotation with its axis angularly disposed relative to the longitudinal axis of said motor, and a gear carried by said driven element with which the other of said pinions cooperates.

3. In a hoisting mechanism, a rotary motor having a rotatable casing, pinions driven by said motor arranged at opposite ends of said casing, a fixed gear with which one of said pinions cooperates, a drum mounted for rotation, and a gear carried by said drum with which the other of said pinions cooperates, the axes of said pinions being angularly disposed relative to the axis of said drum.

4. In a hoisting mechanism, a rotary motor mounted for rotation on a fixed axis, a drum mounted for rotation about a coincident axis, and means positioned at one end of said drum whereby said motor may drive said drum including a gear having means for holding the same stationary or releasing it for rotation about said first mentioned axis, a gear attached to said drum, and driving connections between said motor and said gears, said connection between the drum gear and motor being independent of the other connections.

5. In a hoisting mechanism, a rotary motor mounted for rotation on a fixed axis, a drum mounted for rotation about a coincident axis, and means whereby said motor may drive said drum including a gear having means for holding the same stationary or releasing it for rotation about said first mentioned axis, a gear attached to said drum, and separate similarly rotating gears driven by said motor, one of which meshes with said first mentioned gear while another separate gear meshes with the second mentioned gear.

6. In a hoisting mechanism, a motor having a plurality of intermeshing rotors and mounted for rotation on a fixed axis, gears rotatable on alined axes and operatively mounted on said motor, a drum, a gear carried thereby, and a gear having means for holding the same stationary or releasing it at will, said first mentioned gears intermeshing with said second and third mentioned gears.

7. A hoisting mechanism comprising, in a self-contained unit, a drum, a motor having a casing and a rotor element therein, means for rotatably supporting said casing and drum for rotation on a horizontal axis, with said casing in such relation to said axis that said casing and rotor have their longitudinal axes transverse to said horizontal axis, and means for operatively connecting said drum and motor.

8. A hoisting mechanism comprising a rotatable drum, a motor comprising a casing and a rotatable primary power shaft, means for supporting said drum and said casing for rotation on alined axes and with the primary power shaft of said motor arranged transversely of said alined axes, and power transmitting mechanism including gearing connecting said power shaft and drum.

9. A hoisting mechanism comprising a rotatable drum, a motor comprising a casing and a rotatable primary power shaft, means for supporting said drum and said casing for rotation on alined axes and with the primary power shaft of said motor arranged transversely of said alined axes, and power transmitting mechanism including connections at the opposite ends of said shaft respectively driving the motor casing and driving the drum.

10. A hoisting mechanism comprising a drum, a gear in fixed relation to the drum, a reaction member, a motor, and a pinion at each end of the motor, the latter being revolvable as an entirety so as to carry the pinions through orbits, one of the pinions meshing with the drum gear and the other meshing with the reaction member.

11. In a hoisting mechanism, a motor, two torque delivering means projecting in opposite directions from said motor, a reaction member connected to one of said means, a driving element connected to the other of said means, and a drum fixed to the driving element and disposed with its axis angularly disposed to the torque delivering means.

12. A hoisting mechanism comprising a motor having a rotatable casing, a drum, a gear operative whenever rotation is imparted thereto to effect rotation of said drum, and means whereby said gear may be driven by said rotatable casing comprising a reaction gear and a plurality of reduction gears, the reduction gears being carried by said casing and so disposed that one of them meshes with the gear which rotates the drum.

13. A hoisting mechanism comprising a motor, spaced standards, a reaction member, supporting members for the motor journaled in said standards, a drum journaled on one of said supporting members, the end of the drum adjacent the motor being provided with a gear, and two driving means projecting in opposite directions from the motor, one including a gear meshing with the gear of the drum and the other including means to engage said reaction member.

14. A hoisting mechanism comprising a motor having two alined driving elements projecting in opposite directions from the motor, a reaction member, members for supporting the motor for rotation about an axis transverse to the alined driving elements, and a drum journaled on one of said supporting members, the end of the drum adjacent the motor being provided with a gear, one of the alined driving elements including a gear meshing with the gear of the drum, and the other including means to engage the reaction member.

15. In a hoisting mechanism, a motor having intermeshing rotors, means for supporting said motor for rotation about an axis transverse to the plane including the axes of rotation of the motor rotors, a drum supported coaxially with the axis of rotation of said motor, and driving connections between the motor and drum comprising a driving element disposed so as to extend radially from the axis of rotation of said motor.

16. In a hoisting mechanism, a drum, a driving motor therefor having a casing rotatable on a fixed axis and relative to said drum and coaxial therewith, and means including epicyclic speed reducing gearing operatively connecting said drum and said motor, said epicyclic gearing comprising a plurality of cooperating gear elements certain of which rotate on axes bearing an angular relation to the axes of others.

17. In a hoisting mechanism, a drum, a motor, and means whereby the motor may drive the drum or said drum rotate independently of drive by said motor including two coaxial pinions, gears meshing with said pinions, means for holding said gears stationary or releasing the same for rotation, and means for journaling at least a portion of said drum and motor on a common element and for supporting said pinions with the motor between them, said supporting means being revoluble to move said pinions in orbital paths about said motor.

18. A hoisting mechanism comprising a revolvable motor, spaced standards, supporting members for the motor journaled on said standards, a drum journaled exclusively on one of said supporting members, the end of the drum adjacent the motor being provided with a gear, and means projecting from the motor including a gear meshing with the gear of the drum whereby the drum may be driven by the revolvable motor.

19. In a traction mechanism, in combination, a drum, a motor, common journals for rotatably supporting said motor and drum, said motor being provided with a plurality of terminal power transmitting elements rotating at like angular rates, and means for effecting rotation of said drum by power from said motor including simultaneously operative gear trains respectively connected to said terminal power transmitting elements, one of which effects rotation of said motor.

20. In a traction mechanism, in combination, a drum, a motor, means for rotatably supporting said drum and motor for rotation upon a common axis, said motor being provided with a plurality of terminal power transmitting elements rotating at like angular rates, and means for effecting rotation of said drum by power from said motor including simultaneously operative gear trains respectively connected to said terminal power transmitting elements, one of which effects rotation of said motor and bodily orbital movement of the other element about the axis of drum rotation.

21. In a hoisting mechanism, a hoisting drum, a motor having a casing and intermeshing rotors disposed therein, means for supporting said drum through the motor casing, means for connecting said drum and motor in driving relation including a gear carried by said drum, a normally stationary gear, and motor driven gears rotatable on pivots fixed to said casing and meshing with said first and second mentioned gears.

22. In a hoisting mechanism, a cylindrical rope winding drum, a motor having a casing disposed so as to be within a cylindrical surface containing the surface of said drum, driving connections between said drum and motor including a stationary gear, a gear carried by said drum, said gears being disposed wholly outside of said casing, and motor driven gears carried by and rotatable relative to said casing and meshing with said stationary and drum carried gears respectively, and means for supporting said driven gears at opposite sides of a central plane of said motor, which plane is normal to the axis of drum rotation.

23. A hoisting mechanism comprising a drum, a driving motor therefor having a casing, supporting means for said drum and motor whereby the same are adapted to have relative rotation therebetween, reduction driving gearing between said motor and drum for effecting drive of said drum relative to said casing including a gear freely rotatable when said drum is idle, a pinion carried by said motor, and a gear carried by said motor and meshing with said pinion and having operative connection with said gear which is adapted to idle, and means for holding said idle gear stationary to produce rotation of said drum.

In testimony whereof I affix my signature.

LOUIS A. MAXSON.